(12) United States Patent
Lee et al.

(10) Patent No.: US 8,156,162 B2
(45) Date of Patent: Apr. 10, 2012

(54) STORAGE METHOD AND SEARCH METHOD FOR MARK EVENT ON TWO-DIMENSIONAL SPACE

(75) Inventors: Ching-Sung Lee, Hualien County (TW); Shih-Fang Chang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 403 days.

(21) Appl. No.: 12/182,142

(22) Filed: Jul. 30, 2008

(65) Prior Publication Data

US 2009/0210410 A1    Aug. 20, 2009

(30) Foreign Application Priority Data

Feb. 18, 2008    (TW) ............................... 97105553 A

(51) Int. Cl.
    *G06F 17/30*    (2006.01)
(52) U.S. Cl. ......... 707/812; 707/758; 707/760; 707/743
(58) Field of Classification Search .................. 707/812, 707/758, 760, 743; 382/305; 345/568; 375/142; 706/45; 701/200

See application file for complete search history.

(56) References Cited

U.S. PATENT DOCUMENTS

| | | | | |
|---|---|---|---|---|
| 4,888,698 A * | 12/1989 | Driessen et al. | ............... | 701/200 |
| 5,241,671 A | 8/1993 | Reed et al. | | |
| 5,806,065 A * | 9/1998 | Lomet | ........................... | 707/610 |
| 5,953,722 A * | 9/1999 | Lampert et al. | ....................... | 1/1 |
| 6,868,410 B2 | 3/2005 | Fortin et al. | | |
| 7,010,564 B2 | 3/2006 | Morimoto et al. | | |
| 7,076,507 B1 | 7/2006 | Tarin | | |
| 7,668,817 B2 * | 2/2010 | Enomoto et al. | ............... | 707/760 |
| 7,689,621 B1 * | 3/2010 | Huber et al. | ................... | 707/743 |
| 2005/0137994 A1 * | 6/2005 | Fortin et al. | ..................... | 706/45 |
| 2005/0192938 A1 * | 9/2005 | Miyanohara | ...................... | 707/3 |
| 2006/0170693 A1 * | 8/2006 | Bethune et al. | ............... | 345/568 |
| 2007/0127555 A1 * | 6/2007 | Lynch | ........................... | 375/142 |
| 2007/0253642 A1 * | 11/2007 | Berrill et al. | .................. | 382/305 |

FOREIGN PATENT DOCUMENTS

| | | |
|---|---|---|
| EP | 0280795 | 9/1988 |
| EP | 1681656 | 7/2006 |
| EP | 1826691 | 8/2007 |
| JP | 2001-344591 | 12/2001 |
| JP | 2005-338496 | 12/2005 |
| JP | 2007-010678 | 1/2007 |

OTHER PUBLICATIONS

"Office Action of Taiwan Counterpart Application", issued on Sep. 7, 2011, p1-p7.

* cited by examiner

*Primary Examiner* — Frantz Coby
(74) *Attorney, Agent, or Firm* — Jianq Chyun IP Office

(57) ABSTRACT

A storage method and a search method for mark events on two-dimensional space are provided. First, an event and a corresponding coordinate thereof are retrieved. Next, calculation on the coordinate of the event is performed to generate an index representing a bucket position in a storage device. Next, whether or not there is any existing search tree stored in the bucket position is judged, and then the event is inserted into a linked list of a node of the search tree stored in the bucket position according to a judgment result. Besides, when a range on the two-dimensional space is designated, corresponding nodes in the search tree are rapidly accessed according to the index obtained by a hash function, and further by application of pointers pointing to the bucket position having the search tree stored therein and by real-time return of search result, the search speed is high.

12 Claims, 8 Drawing Sheets

STORAGE METHOD AND SEARCH METHOD FOR MARK EVENT ON TWO-DIMENSIONAL SPACE

CROSS-REFERENCE TO RELATED APPLICATION

This application claims the priority benefit of Taiwan application serial no. 97105553, filed on Feb. 18, 2008. The entirety of the above-mentioned patent application is hereby incorporated by reference herein and made a part of this specification.

BACKGROUND OF THE INVENTION

1. Field of Invention

The present invention relates to a storage method and a search method for mark events on two-dimensional space.

2. Description of Related Art

With coming of an era of Web 2.0, Websites with rich contents and community interactions provide a large amount of map services such as Google maps, Yahoo! maps, Windows live local, for providing information to users. To provide fast online mapping services to users, related techniques are continuously developed. For example, a Japanese patent application laid-open publication no. JP2005338496 discloses a map display system, in which a map is divided into a plurality of small regions based on a numerical feature of latitudes and longitudes, and such small regions are stored as images. The latitudes and the longitudes are used as indexes for searching images, so as to accelerate map searching.

Such online mapping service allows the users to search landmarks, to browse the map by dragging and dropping, to flag data points on the map and to mark an area with polygon lines for customizing related information on the map. Map data may be enriched via annotation effort of the whole community, so as to share the information.

After data of the online mapping service is enriched, inquiry performed based on the latitudes and the longitudes may have a poor performance due to a large amount of data. During inquiring of rectangular regions on map, the amount of data (i.e. the latitudes information and the longitudes information having numerical continuity) required to be searched is much more.

Accordingly, the present invention is directed to a storage method and a search method for mark events on a two-dimensional space, by which system cost and system performance may be well balanced.

SUMMARY OF THE INVENTION

The present invention is directed to a storage method and a search method for mark events on a two-dimensional space, in which by applying a search tree and a hash algorithm, coordinates of the event are stored in nodes of a search tree stored in a bucket position of a storage device. By such means, a corresponding bucket position within the storage device according to the coordinates of the events may be found and the events stored in the found bucket position may be accessed in high speed and in real-time return. Then, accessing of the event may be performed.

One example of the present invention provides a storage method for mark events on a two-dimensional space. First, an event and a related first degree and a second degree are provided. Next, the first degree is calculated by an algorithm to generate an index pointing to a bucket position in a storage device. Next, whether or not there is any existing search tree stored in the bucket position pointed by the index is judged. If yes, the event is inserted into a corresponding linked list of the node, which is corresponding to the second degree, of the search tree. If not, a search tree with a root node thereof being the second degree is then established, and the event is inserted into a corresponding linked list of the root node of the established search tree.

Another example of the present invention provides a searching method for mark events on a two-dimensional space. First, an inquiry range is designated on a map, wherein coordinates of the inquiry range relate to a first degree, a second degree, a third degree and a fourth degree. Next, the first degree and the third degree are calculated according to an algorithm to generate a first index and a second index respectively pointing to a first bucket position and a second bucket position in the storage device. Next, a search tree between the first bucket position and the second bucket position is searched. Next, the second degree and the fourth degree are taken as searching conditions for searching a corresponding node of the found search tree stored between the first bucket position and the second bucket position. Finally, all corresponding events within the found nodes of the search tree are returned back, and the returned back events are real-time displayed at related coordinates of the two-dimensional space.

In examples of the present invention, when the event is accessed, the index is calculated according to an algorithm (for example a hash function algorithm. A bucket hashing algorithm can be used to implement the hash function, wherein each array location the header of a linked list of values that hash to that location), and then the search tree are established at a corresponding bucket position, pointed by the index, within the storage device. The event may be stored in the linked list of the node of the search tree. During inquiring, the required events may be retrieved from the matched linked list of the node. Therefore, accessing speed of the event and storage utilization of the storage device may be improved.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
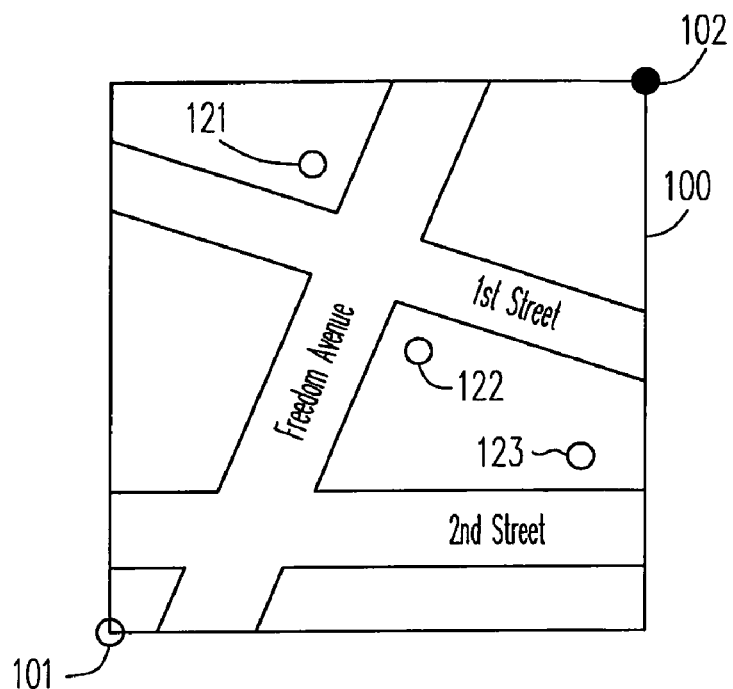
FIG. 1 is a schematic diagram of a coordinates map having a function of displaying events.

Reference will now be made in detail to the present embodiments of the invention, examples of which are illustrated in the accompanying drawings. Wherever possible, the same reference numbers are used in the drawings and the description to refer to the same or like parts.

In embodiments of the present invention, since longitudes and latitudes of coordinates of events have a feature of numerical continuity, the longitudes (or the latitudes) may function as searching indexes after calculation of a hash function on the longitudes (or the latitudes). The latitudes (or the longitudes) may be stored in nodes of a search tree, so as to reduce information search load, and to reduce system load and to expedite inquiry. To fully convey the spirit of the present invention, embodiments are provided below.

FIG. 1 is a schematic diagram of a two-dimensional space having a function of displaying events.

When a user uses a browser (for example, a firefox) to browse a map 100, events 121~123 may be sequentially displayed on the map 100 according to latitude and longitude pairs of boundary points 101 and 102 of the map 100.

In the present embodiment, if a format of the latitude and the longitude is in degree-minute-second, under some circumstances, the above format may be converted into a decimal format. For example, a longitude 123°00'00" may be converted into 123.000000. During calculation of the hash function, the latitude and the longitude (for example, 123000000) in the decimal format are used. The present embodiment is not limited by the decimal format, and a binary format, an octal format, a hexadecimal format, or other similar format may also be applied. Certainly, during operation of the hash function, format conversion is unnecessary, namely, under some circumstances, the hash function may be performed based on the latitude and the longitude in the degree-minute-second format.

Figure 2:
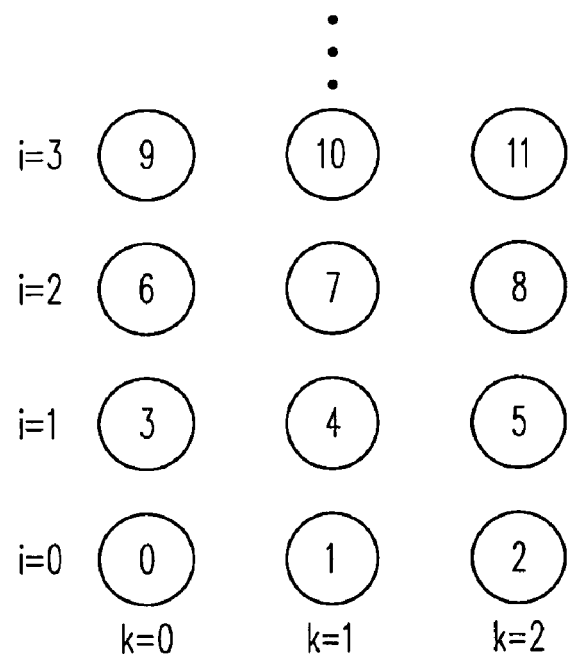
FIG. 2 is a schematic diagram illustrating arrangement of bucket positions based on a hash function.

Referring to FIG. 2 for a detailed description of how the hash function being applied to generate an index of a storage device.

FIG. 2 is a schematic diagram illustrating bucket positions based on a hash function. After integers being operated by a division-hash function, values obtained are used as the bucket position (k,i) of the storage device. For example, assume the storage device has 3 buckets, after a numeral "11" is operated by the division-hash function (i.e. 11 is divided by 3), a remainder is 2, and a quotient is 3. Namely, a corresponding bucket position of the numeral 11 in the storage device is (2,3), i.e. the numeral 11 corresponds to position 3 (quotient obtained) of a second (remainder obtained) bucket of the storage device. Accordingly, a longitude may correspond to a bucket position after being operated by the hash function algorithm and this is a step of establishing a bucket position index of the storage device based on the hash function.

It should be noted that in FIG. 2, the numerals (for example 0~11) displayed at the bucket positions are only used for facilitating acknowledgement of the corresponding bucket positions of the numerals, and the numbers are not actually stored within the bucket positions.

Wherein, the storage device is a sequentially write and random read storage device, for example, a read only memory (ROM), a dynamic random access memory (DRAM), a synchronous dynamic random access memory (SDRAM), a flash memory, a CD-ROM, a DVD-ROM, a hard disk drive (HDD), a floppy disk drive (FDD), a solid state disk (SSD) or a magneto-optical disc (MO disc) etc.

Figure 3:
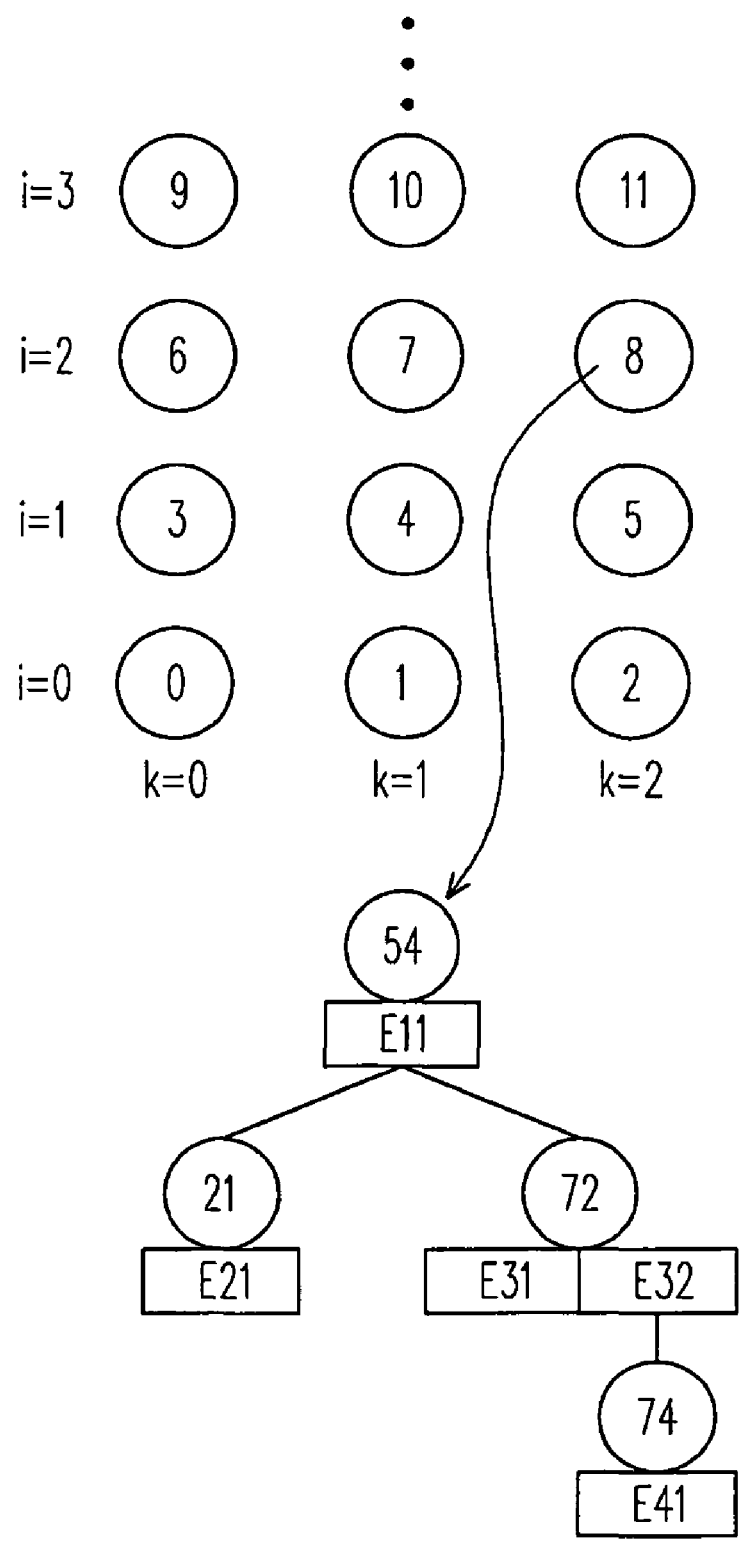
FIG. 3 is a schematic diagram illustrating bucket positions with search tree, based on a hash function calculation and a search tree algorithm according to an embodiment of the present invention.

Referring to FIG. 3, FIG. 3 is a schematic diagram illustrating bucket positions calculated based on a hash function calculation and a search tree algorithm according to an embodiment of the present invention. Assuming the latitudes, the longitudes and events are respectively (8,54,E11), (8,21, E21), (8,72,E31~E32) and (8,74,E41). The (8,54,E11) represents the event E11 is located at the longitude 8 and the latitude 54. The others may be deduced by analogy. Sometimes, there may be a plurality of events at a same position, for example, the events E31 and E32 are located at the same position of the longitude 8 and the latitude 72.

The longitude 8° in degree-minute-second format is converted to 8 in decimal format after the format conversion, and after operation of the division-hash function, the bucket position (k,i) is found. Taking a hash function with modulus 3 as an example, the bucket position k=2 and i=2 is determined. When the search tree is established at the bucket position (2,2), the latitudes converted by the decimal format conversion (the latitudes in degree-minute-second format are converted into the decimal format or converted into the numerical format) are considered to be nodes or root nodes of the search tree during establishing the search tree. As shown in FIG. 3, the nodes of the search tree include 54, 21, 72 and 74. The search tree may be a balance tree (B-tree) or a height-balanced tree (R-tree), or other similar search trees. It should be noted that the present invention is not limited to the types of the search tree.

Sometimes, not all the bucket positions have the search trees (namely, there is no event stored at such nodes of the search trees), and such bucket positions are referred to as "empty bucket positions". During searching, the empty bucket positions may be skipped to accelerate the searching speed, and each of "non-empty" bucket positions have an address pointer pointing to a next non-empty bucket position. Here, the so-called non-empty bucket position means the bucket position has the search tree stored therein.

Figure 4A:
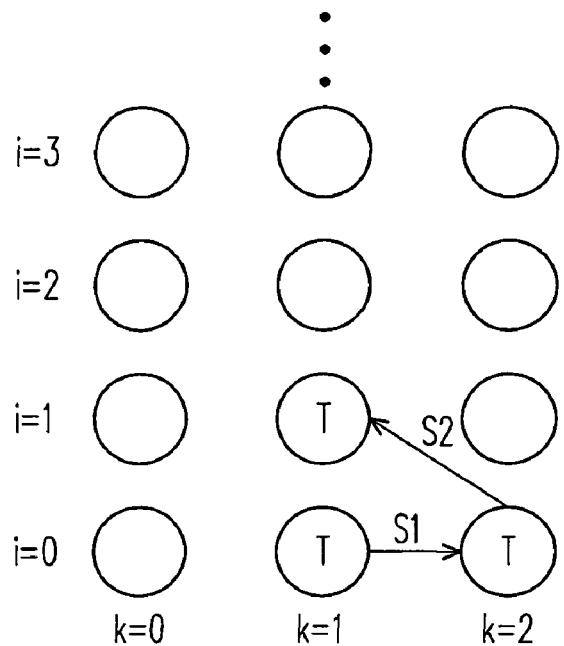
FIG. 4A is a schematic diagram of bucket positions when there is not any search tree stored in a bucket position (0,1).

Referring to FIG. 4A, FIG. 4A is a schematic diagram of bucket positions when there is not any search tree stored in a bucket position (0,1). Assuming search trees have already been established at the bucket positions (1,0), (2,0) and (1,1), and no search trees are established at other bucket positions. The bucket positions with the established search trees (i.e. the "non-empty bucket positions") are marked by "T", and the bucket positions without the search trees (i.e. the "empty bucket positions") are empty.

In FIG. 4A, the pointer may point to a next bucket position having the search tree. For example, a pointer s1 of the bucket position (1,0) points to the next bucket position (2,0) having the search tree, and a pointer s2 of the bucket position (2,0) points to the bucket position (1,1).

Figure 4B:
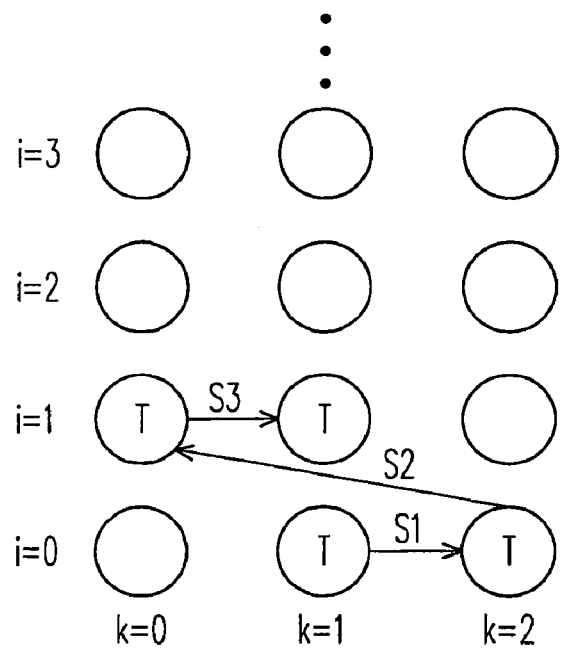
FIG. 4B is a schematic diagram of bucket positions when a new search tree is established and stored in the bucket position (0,1).

Now explain if a new search tree is about to be added to the bucket position (0,1). Referring to FIG. 4B, FIG. 4B is a schematic diagram of bucket positions when a new search tree is added to a bucket position (0,1). When a new search tree is added to the bucket position (0,1), by looking backward from the bucket position (0,1) to the bucket position (2,0), the pointer s2 of the bucket position (2,0) is updated and points to the bucket position (0,1), and meanwhile a new pointer s3 is added to the bucket position (0,1), which points to the bucket position (1,1) by looking forward. By applying the pointers, the empty bucket positions then may be skipped during searching, so that speed of event search is then improved.

Conversely, if the search tree stored in the bucket position (0,1) of FIG. 4B is deleted, the pointer s2 of the bucket position (2,0) is then updated and points to the bucket position (1,1) as that shown in FIG. 4A, so as to skip the empty bucket positions during searching.

Figure 5:
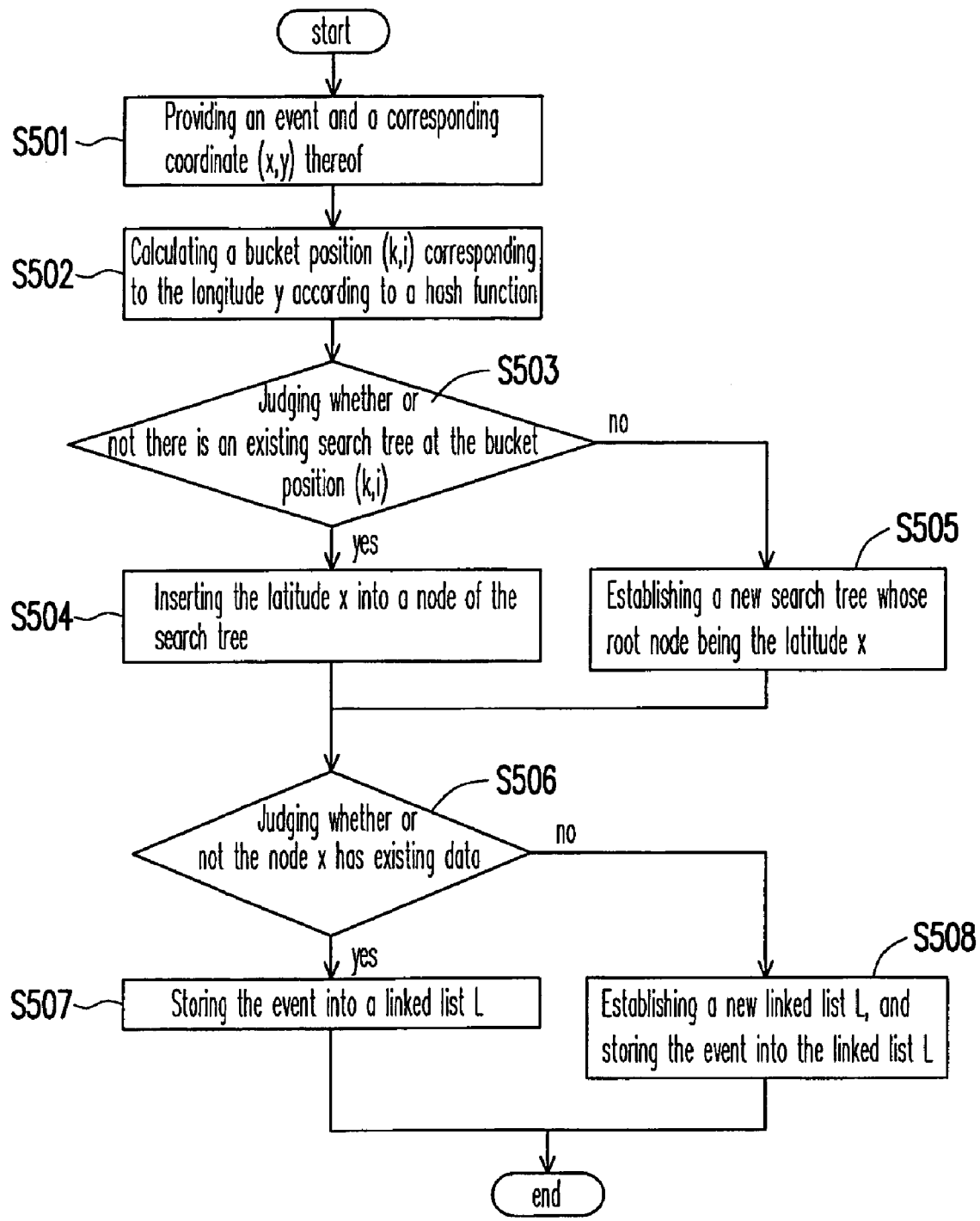
FIG. 5 is a flowchart illustrating a storage method based on a hash function calculation and a search tree algorithm according to an embodiment of the present invention.

In the following content, how to add a new event to the bucket position of the storage device is described. FIG. 5 is a flowchart illustrating a storage method for mark events on a two-dimensional space based on a hash function calculation and a search tree algorithm according to an embodiment of the present invention.

First, an event and a coordinate thereof are provided, wherein the coordinate is represented by the latitude and the longitude (step S501), and the longitude is, for example, represented by x, and the latitude is, for example, represented by y. After the format conversion, the latitude and longitude in degree-minute-second format are converted into the latitude and longitude in decimal format. The latitude and the longitude of the event may be obtained via network maps or the global positioning system (GPS).

Next, as described in the above embodiment, the bucket position (k,i) corresponding to the longitude y within the storage device are calculated based on the hash function (step S502).

Next, whether or not the bucket position (k,i) already has the search tree is judged (step S503). If yes, a step S504 is then executed; and if not, a step S505 is then executed.

If a search tree is already stored in the bucket position (k,i), the latitude x is then inserted as a node into the established search tree (step S504).

If no search tree is stored in the bucket position (k,i), a new search tree is then established at the bucket position (k,i), wherein a root node thereof is the latitude x (step S505). Certainly, when a new search tree (with the root node thereof being the latitude x) is established, with reference of FIG. 4B, the pointer thereof is renewed and the pointer of a previous or a next non-empty bucket position is also renewed for accelerating searching.

Next, whether or not the node y has other existing events is judged, namely, whether or not the node y has any existing linked list is judged (step S506). If yes, a step S507 is executed; conversely, a step S508 is then executed.

If the node y already has an existing linked list L, the event is then stored into the linked list L (step S507).

If the node y does not have the linked list, the linked list L is then established on this node, and then the event is stored into the linked list L (step S508).

Until now, storage of the event into the search tree is completed.

Figure 6:
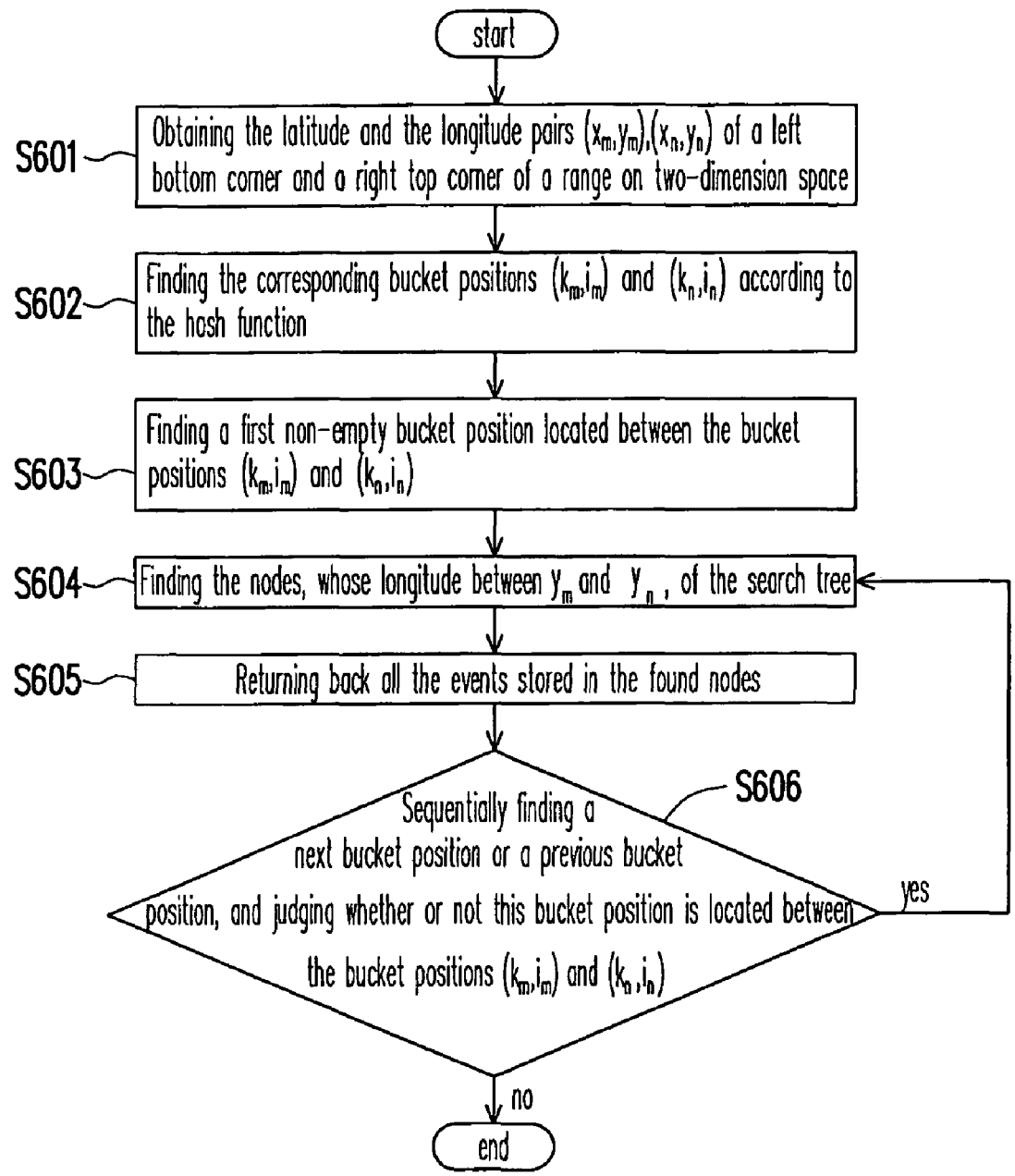
FIG. 6 is a flowchart illustrating a search method based on a hash function calculation and a search tree algorithm according to an embodiment of the present invention.

Now, how to search all the events within a certain range of the map is described. Referring to FIG. 1 and FIG. 6, FIG. 6 is a flowchart illustrating a search method for mark events on a two-dimensional space based on a hash function calculation and a search tree algorithm according to an embodiment of the present invention. It should be noted that in the flowchart of FIG. 6, the bucket positions do not have pointers.

A left bottom corner of the range is the boundary point 101, and a right top corner thereof is the boundary point 102. The latitude and the longitude pairs of the boundary points 101 and 102 are respectively $(x_m, y_m)$ and $(x_n, y_n)$ (step S601).

Next, as described above, corresponding bucket positions $(k_m, i_m)$ and $(k_n, i_n)$ of the latitudes $x_m$ and $x_n$ are obtained by the hash function (step S602). Certainly, before operation of the hash function, the latitudes $x_m$ and $x_n$ may be converted into the decimal format if necessary.

Next, a first non-empty bucket position located between the bucket positions $(k_m, i_m)$ and $(k_n, i_n)$ is found (step S603). For example, in FIG. 4A, the bucket position (1,0) located between the bucket positions (0,0) and (2,1) is the first found non-empty bucket position.

The nodes with longitude between $y_m$ and $y_n$ are found from the found search tree (step S604).

All the events stored in the found nodes are returned back (step S605).

Next, a next bucket position is sequentially found, and whether or not this bucket position is located between the bucket positions $(k_m, i_m)$ and $(k_n, i_n)$ is judged (step S606). If yes, the steps S604 and S605 are then repeated. Conversely, operation of inquiry is completed.

Wherein, when if any one mark event on the map is searched, such event is real-time displayed on the map, so that the user may duly view the event on a screen.

Figure 7A:
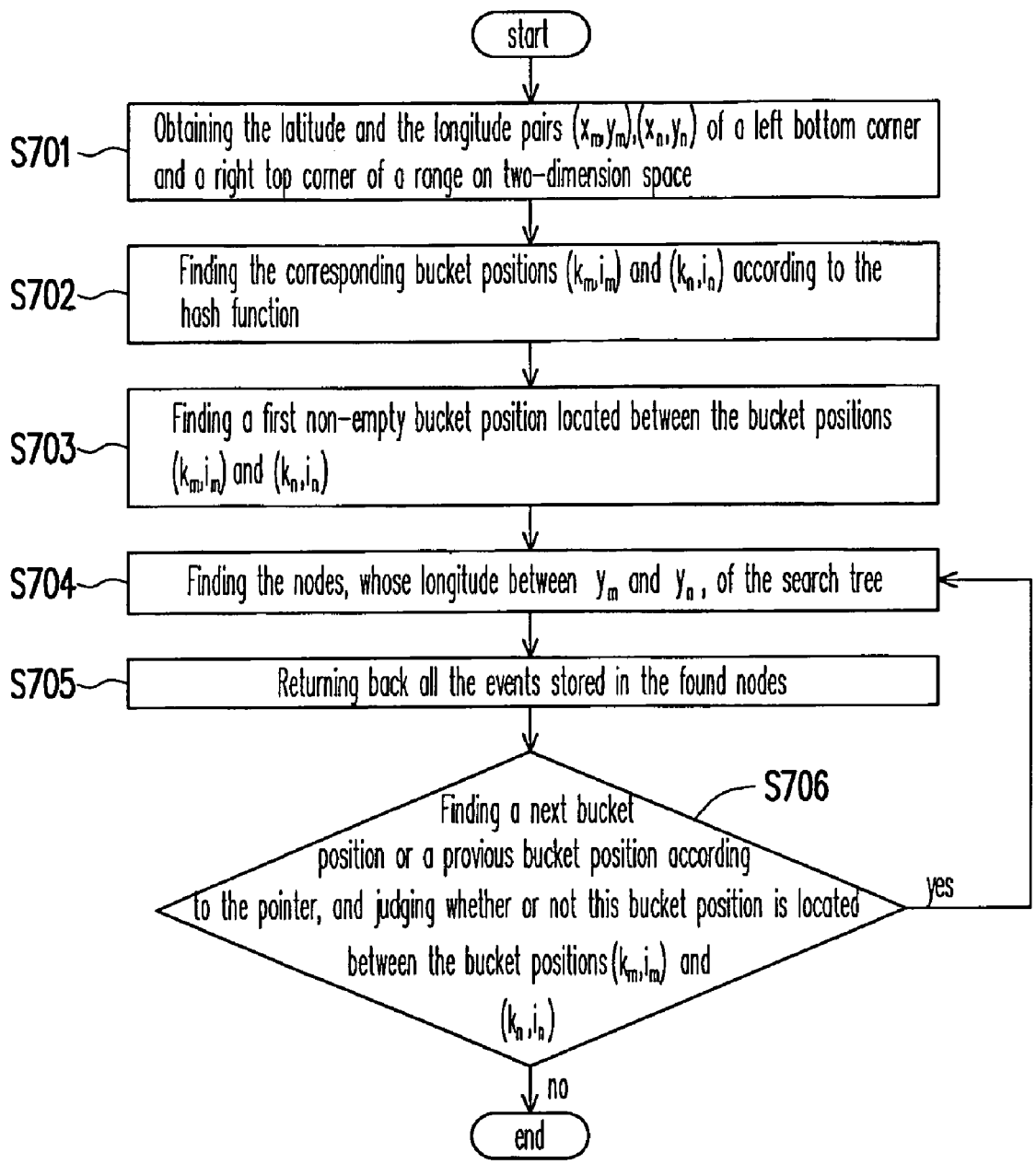
FIG. 7A is a flowchart illustrating a search method for mark events based on a hash function calculation and a search tree algorithm, having a pointer function according to an embodiment of the present invention.

Moreover, the inquiry then may be accelerated via incorporation of pointers. Referring to FIG. 7A, FIG. 7A is a flowchart illustrating a search method for mark events on a two-dimensional space having a pointer function according to an embodiment of the present invention.

Referring FIG. 1 and FIG. 7A, the left bottom corner of the range on the map is the boundary point 101, and the right top corner thereof is the boundary point 102. The latitude and the longitude of the boundary points 101 and 102 are respectively $(x_m, y_m)$ and $(x_n, y_n)$ (step S701).

Next, the bucket positions $(k_m, i_m)$ and $(k_n, i_n)$ corresponding to the latitudes $x_m$ and $x_n$ are obtained via operation of the hash function (step S702). Certainly, before operation of the hash function, the latitudes $x_m$ and $x_n$ may be converted into the decimal format if necessary.

Next, a first non-empty bucket position located between the bucket positions $(k_m, i_m)$ and $(k_n, i_n)$ are found (step S703). For example, in FIG. 4A, the bucket position (1,0) located between the bucket positions (0,0) and (2,1) is the first non-empty bucket position.

The nodes with longitude being between $y_m$ and $y_n$ are found from the search tree (step S704), and all the events stored within the found nodes are returned back (step S705).

Finally, a next non-empty bucket position is found according to a pointer S, and whether or not this non-empty bucket position is located between the bucket positions $(k_m, i_m)$ and $(k_n, i_n)$ is judged (step S706). If yes, the steps S704 and S705 are then repeated. Conversely, operation of inquiry is completed.

During repeating of the steps S704 and S705, when any one event is searched, such event is real-time displayed at the related coordinates, so that the user may duly view the event on a screen.

Moreover, the range on the map to be searched may be designated by the user, for example, the range may be designated by mouse dragging a rectangle area by users. Further, incorporated with a subscription service of the really simple syndication (RSS), when a new event is appeared within the designated range, the user may receive a notification of the appearance of the new event in real-time.

Figure 7B:
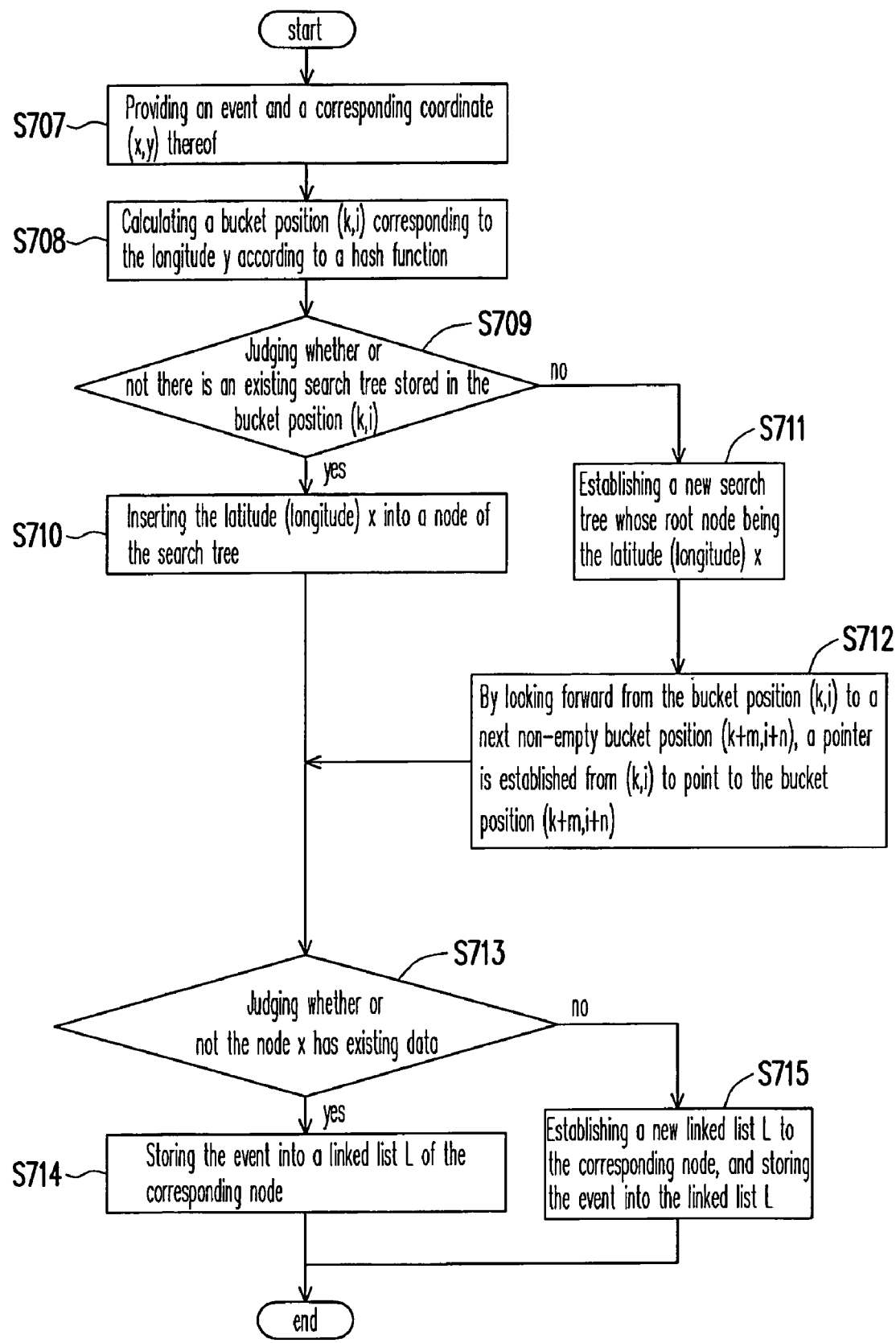
FIG. 7B is a flowchart illustrating a storage method for mark events based on a hash function calculation and a search tree algorithm according to an embodiment of the present invention.

In the following content, how to add a new event to a bucket position and how to renew a pointer of the bucket position are described. FIG. 7B is a flowchart illustrating a storage method for mark events based on a hash function calculation and a search tree algorithm according to an embodiment of the present invention.

First, an event and the latitude and the longitude thereof are provided by the user (step S707), wherein the longitude is, for example, represented by y, and the latitude is, for example, represented by x.

Next, as described above, the bucket position (k,i) corresponding to the longitude y within the storage device are calculated based on the hash function (step S708).

Next, whether or not there is any search tree stored in the bucket position (k,i) is judged (step S709). If yes, a step S710 is then executed; and if not, a step S711 is then executed.

If there is any search tree stored in the bucket position (k,i), the latitude x is then considered to be a node and is inserted into the established search tree (step S710).

If there is no any search tree stored in the bucket position (k,i), a new search tree is then established at the bucket position (k,i), wherein a root node thereof is the latitude x (step S711).

By looking forward from the bucket position (k,i) to a next non-empty bucket position (k+m,i+n), a pointer is established from (k,i) to point to the bucket position (k+m,i+n) (or such position is recorded). Alternatively, by looking backward from the bucket position (k,i) to a former non-empty bucket position (k−p,i−q), the pointer of the (k−p,i−q) is updated and points to the position (k,i) (step S712).

Next, whether or not the node x has other existing events is judged, namely, whether or not the node x has any existing linked list is judged (step S713). If yes, a step S714 is executed; conversely, a step S715 is then executed.

If the node x already has an existing linked list L, the event is then stored into the linked list L (step S714).

If the node y does not have any linked list, a new linked list L is then established on this node, and then the event is stored into the linked list L (step S715).

By so, storage of the events into the search tree is completed and the pointer is renewed.

Figure 8:
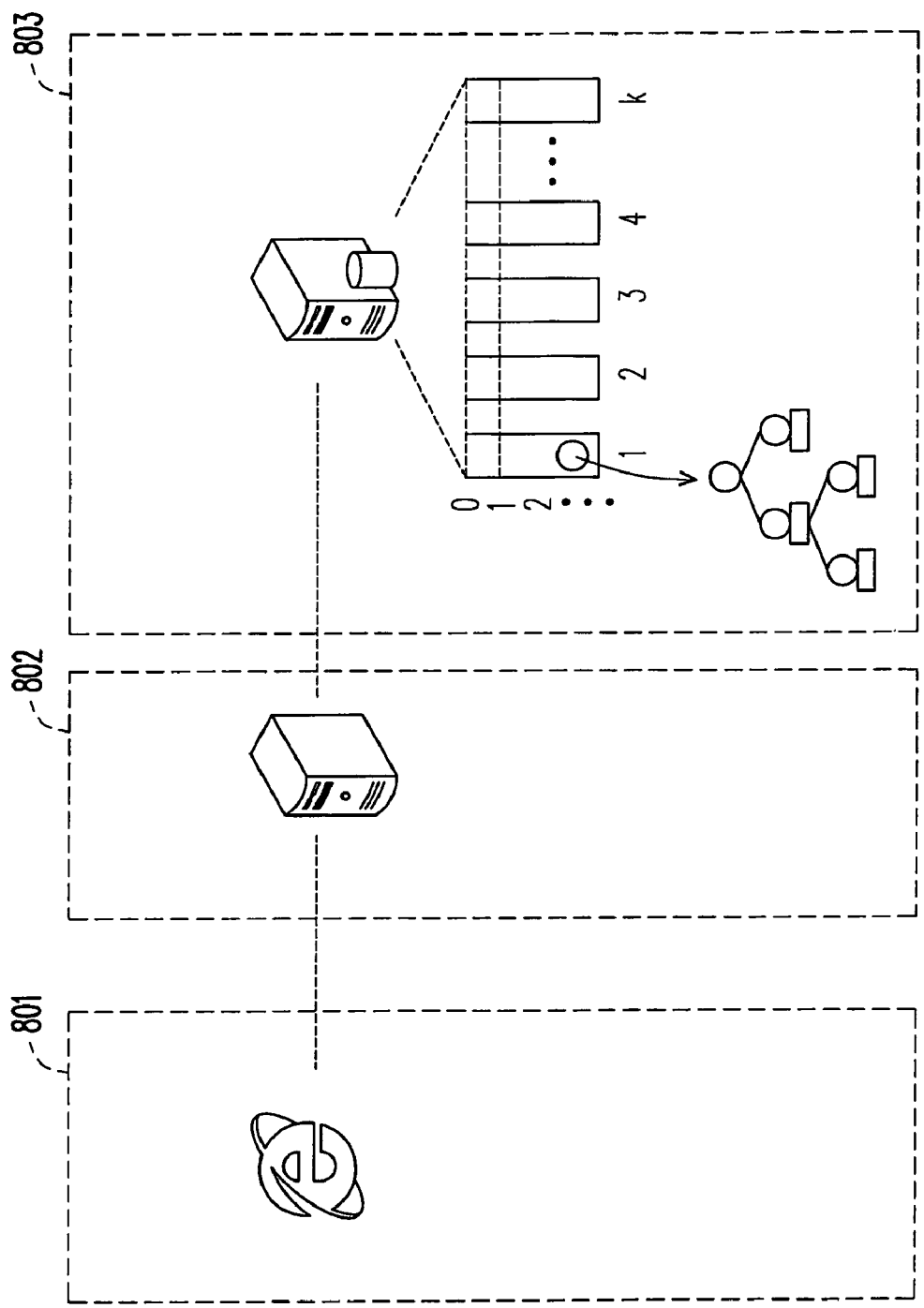
FIG. 8 is a schematic diagram of a system according to an embodiment of the present invention.

Finally, referring to FIG. 8, FIG. 8 is a schematic diagram of a system according to an embodiment of the present invention. The system includes a data I/O unit 801, a server unit 802 with an online mapping service and a data search unit 803. The server unit 802 may receive events and the latitude and longitude pairs thereof received from the data I/O unit 801, for transmitting to the data search unit 803.

The data I/O unit 801 may be a user's browser, the server unit 802 may be the Google maps, and the data search unit 803 may be a database having a hash function and a search tree index function.

If the database has data amount of "a", and the search tree has "b" nodes, wherein a>>b, based on embodiments of the present invention, a complexity on pointing to the bucket position is O(1), a complexity on searching the search tree is O(log b), and a average complexity on accessing is O(1)+O(log b), namely, in the embodiments of the present invention, hardware cost of the storage device and the search speed are well-balanced.

In summary, in embodiments of the present invention, an index of the bucket position is calculated according a calculation on coordinates of events by the hash function, and the bucket position corresponds to a search tree. The latitudes of events are stored as nodes of the search tree, and each of the nodes has the linked list. Thus, the events then may be stored into the corresponding linked list of the corresponding node. Moreover, the bucket position and the search tree may be quickly found (by the hash function), and the desired event may be found from the linked list of the node of the search tree. The embodiments of the present invention may be applied to storage systems whose key-in values are in type of latitude and longitude pairs, for providing back-end accessing to related mapping service Website, so as to accelerate accessing and to display the found events to users in real-time, so that service quality of the Website is improved, and a better user experience is achieved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A storage method for mark events on a two-dimensional space, comprising:

providing one of the events and a first degree and a second degree of a coordinate of said one event;

performing calculation on the first degree according to an algorithm, to obtain an index pointing to a bucket position of a storage device;

judging whether or not there is a search tree stored in the bucket position;

inserting said one event into a linked list of a node, corresponding to the second degree, of the search tree, if any search tree stored in the bucket position, wherein the linked list is composed of a plurality of the events and does not include any node of the search tree, each node of the search tree is corresponding to a different second degree of the coordinates of the events; and establishing a new search tree whose a root node being the second degree of said one event, and inserting said one event into the linked list of the root node of the established search tree, if there is no any search tree stored in the bucket position.

2. The storage method for mark events on a two-dimensional space as claimed in claim 1, wherein the first degree of said one event is in type of one of a longitude and a latitude, and the second degree of said one event is in the other type.

3. The storage method for mark events on a two-dimensional space as claimed in claim 2, wherein the first degree and the second degree of said one event are in numerical format or in degree-minute-second format.

4. The storage method for mark events on a two-dimensional space as claimed in claim 1, wherein the algorithm is a hash function.

5. The storage method for mark events on a two-dimensional space as claimed in claim 1, wherein the search tree is a balance tree or a height-balanced tree.

6. The storage method for mark events on a two-dimensional space as claimed in claim 1, wherein:

the bucket position further has a pointer pointing to a next non-empty bucket position or to a previous non-empty bucket position; and when the search tree is newly established, a pointer of the previous non-empty bucket position or a pointer of the next non-empty bucket position is renewed.

7. A search method for mark events on a two-dimensional space, comprising:

designating an inquiry range on a map, wherein coordinates of the inquiry range relates to a first degree, a second degree, a third degree and a fourth degree;

performing calculation on the first degree and the third degree according to an algorithm to obtain a first index and a second index, wherein the first index and the second index respectively point to a first bucket position and a second bucket position of a storage device;

searching a search tree stored between the first bucket position and the second bucket position;

searching a corresponding node of the found search tree stored between the first bucket position and the second bucket position while taking the second degree and the fourth degree as searching conditions; and returning back all the events stored in the matched nodes, and real-time displaying the events on the two-dimensional space.

8. The search method for mark events on a two-dimensional space as claimed in claim 7, wherein the first degree and the third degree are in type of one of a longitude and a latitude, and the second degree and the fourth degree are in the other type.

9. The search method for mark events on a two-dimensional space as claimed in claim 8, wherein the first degree, the second degree, the third degree and the fourth degree are in numerical format or in degree-minute-second format.

10. The search method for mark events on a two-dimensional space as claimed in claim 7, wherein the algorithm is a hash function.

11. The search method for mark events on a two-dimensional space as claimed in claim 7, wherein the search tree is a balance tree or a height-balanced tree.

12. The search method for mark events on a two-dimensional space as claimed in claim 7, wherein:

each of the bucket positions within the storage device has a pointer pointing to a next non-empty bucket position or to a previous non-empty bucket position; and when the search tree is newly established, a pointer of the previous non-empty bucket position or a pointer of the next non-empty bucket position is renewed.

\* \* \* \* \*